Figure 1:
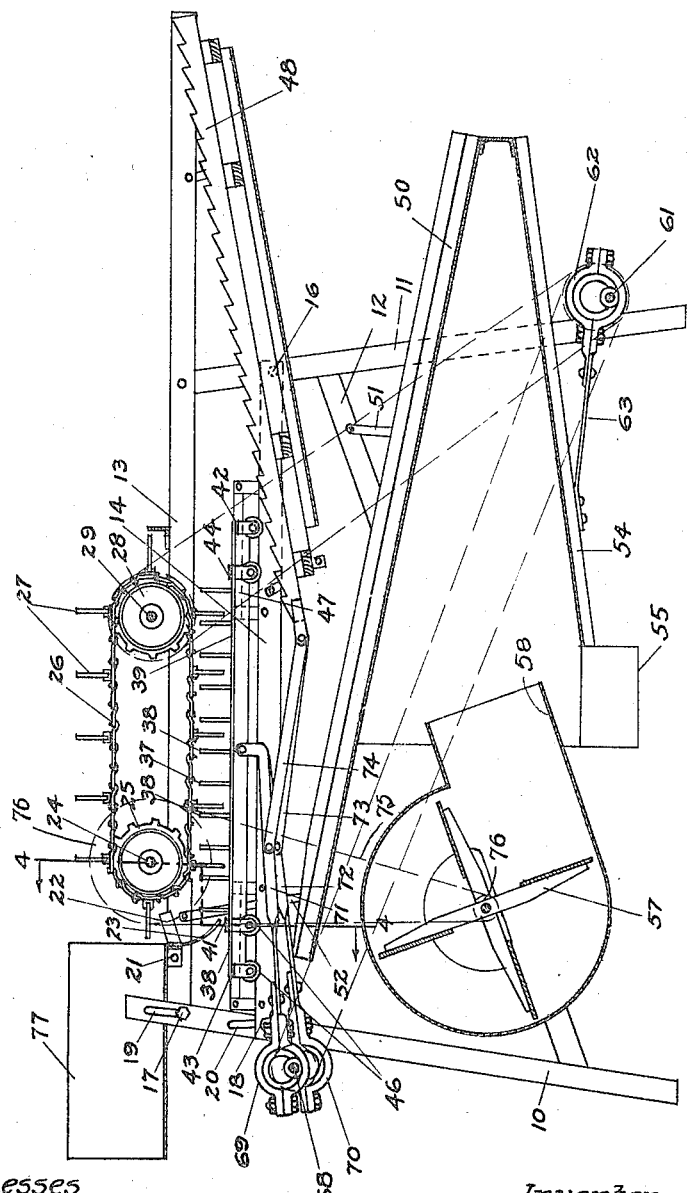

N. G. EK.
THRESHING MACHINE.
APPLICATION FILED AUG. 21, 1915.
1,257,592.
Patented Feb. 26, 1918.
4 SHEETS—SHEET 2.
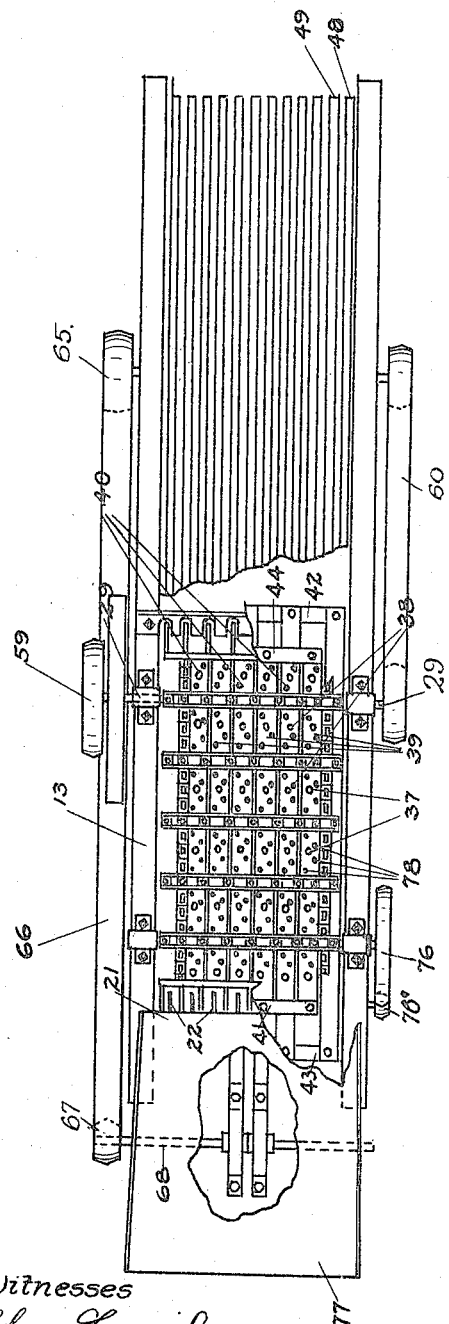
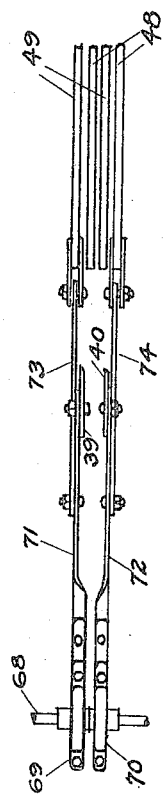
Witnesses
Alex. Fagaard
A. M. Royal
Inventor
Nels G. Ek.
By A. Whitley
His Attorney.

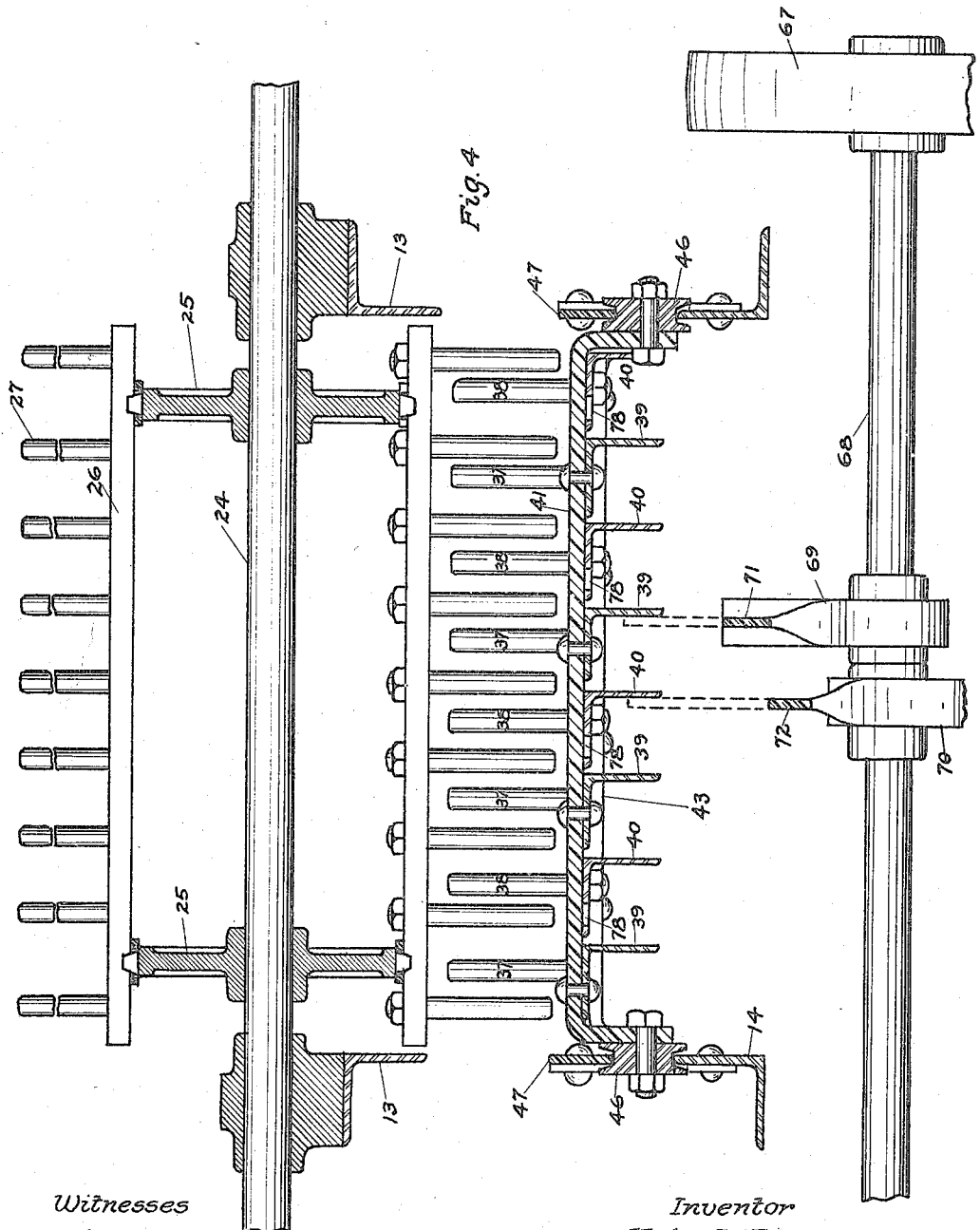

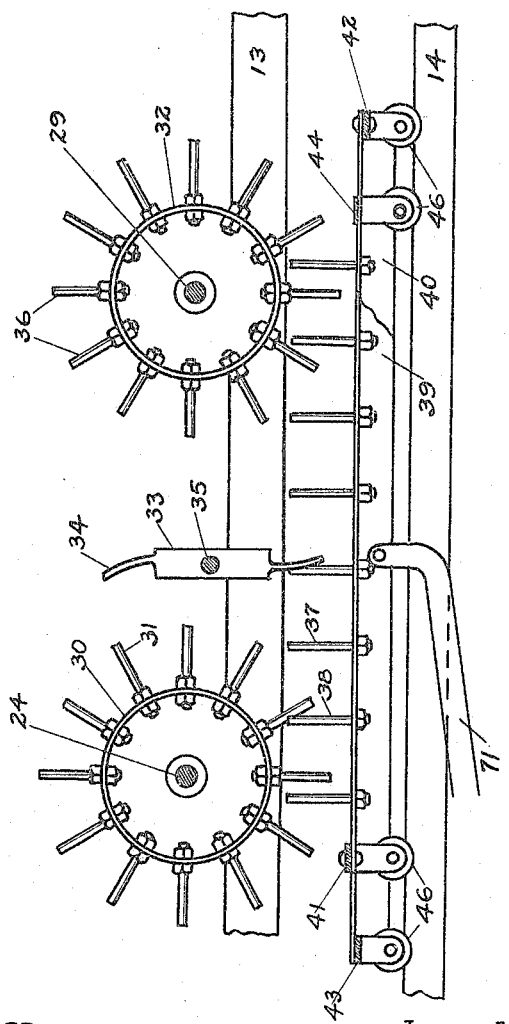

UNITED STATES PATENT OFFICE.

NELS G. EK, OF MINNEAPOLIS, MINNESOTA.

THRESHING-MACHINE.

1,257,592.  Specification of Letters Patent.  Patented Feb. 26, 1918.

Application filed August 21, 1915. Serial No. 46,611.

*To all whom it may concern:*

Be it known that I, NELS G. EK, a citizen of the United States, residing at Minneapolis, in the county of Hennepin and State of Minnesota, have invented certain new and useful Improvements in Threshing-Machines, of which the following is a specification.

My invention relates to separators or threshing machines and has for its object to provide a threshing machine of novel construction which is adapted to operate upon peas, beans and the like, and also upon small grain such as oats, rye and wheat.

It is the primary object of my invention to provide a separator embodying stationary and movable toothed members so related that while the teeth pass each other in positions relatively widely separated to permit the threshing of large seeded products such as beans and peas, yet operate in such manner upon the grain by reason of rapid and continuous rubbing action that small grains such as wheat, oats, etc., may also be efficiently and readily threshed.

I accomplish these results by providing, in combination with a rotating or continuously-moving toothed member and a stationary toothed member such as a concave, one or more series of reciprocating toothed members coöperating therewith and operating to delay the forwarding action upon the grain to permit extensive rubbing action while the same is passing through the machine.

The full objects and advantages of my invention will appear in connection with the detailed description thereof and are particularly pointed out in the claims.

In the drawings, illustrating the application of my invention in one form,

Figure 1 is a longitudinal vertical sectional elevation view of my machine. Fig. 2 is a plan view of the same. Fig. 3 is a detail view showing the manner of connecting the reciprocating parts for oscillation. Fig. 4 is an enlarged section on line 4—4 of Fig. 1 viewed in the direction of the arrows. Fig. 5 is a partial sectional elevation showing a modified form of the invention.

As illustrated, the invention comprises front and rear frame supports 10 and 11 connected together by braces 12 in any well-known manner. An upper longitudinal frame construction comprises parallel frame members 13 and 14 pivoted to supporting frame members 11 at 15 and 16 and adjustably connected with supporting frame members 10 by means of bolts 17 and 18 extending through slots 19 and 20 in said frame members 10. By this means the angle of the top frame supporting the threshing or separating members may be adjusted so as to incline said frame and the members carried thereby more or less according to the nature of the product which is being threshed, and also its condition at the time of threshing. If the straw is at all damp it may be necessary to incline these members more than would be the case if the straw is dry and bright.

Rigidly secured between the top frame members 13 is a transverse bar 21 having thereon a plurality of teeth 22 extending in a rearward direction, and a guard 23 of sheet metal or other suitable material extending in a curved manner downwardly from the bar 21. This construction corresponds in some respects to the threshing concave commonly employed in threshing machines of well-known construction, except that there is only one rigid bar provided with a single row of teeth and that the teeth are more widely spaced than is the fact with such common types of threshing machines. Journaled upon bearings formed on the frame members 13 are transverse shafts 24 and 29 upon which, as shown in Fig. 1, are sprocket wheels 25 and 28 over which run sprocket chains forming portions of an endless belt 26 provided with pins 27.

As shown in Fig. 5 in the modified form, the shaft 24 is provided with a cylinder 30 having teeth 31 which, like the teeth 27 on endless belt 26, coöperate with the teeth 22 on bar 21. Shaft 29 in the construction of Fig. 5 also is provided with a toothed cylinder 32, and an intermediate beater cylinder 33 provided with beater teeth 34 is fast on a shaft 35 intermediate shafts 24 and 29.

In either the form shown in Fig. 1 or Fig. 5, the teeth 27 of the former construction, or 31, 34 and 36 of the latter construction, coöperate with sets of teeth 37 and 38 on respective sets of alternately-arranged sets of grid bars 39 and 40 arranged for oscillation in a plane parallel with the plane of the members 13 and 14. All of the grid bars 39 and 40, as clearly shown in Fig. 4, comprise angle iron strips in which the pins or teeth 37 and 38, respectively, are rigidly secured. The bars 39 are bolted to the under side of an arched front crossbar 41 and to the top of an arched crossbar 42 at the rear thereof; while the bars 38 are bolted to the top of an arched front crossbar 43 and to the under side of a rear arched crossbar 44; the respective front crossbars 41 and 43 and rear crossbars 42 and 44 being spaced from one another, as clearly shown in Figs. 1 and 5, and each being provided with rollers 46 operative upon the upturned edge of frame members 14 and being held to move along said frame members by overhung guides 47 which are held sufficiently spaced above the edge of frame members 14 to permit the grooved rollers 46 to operate between members 14 and said guides 47.

The grids 39 and 40 are arranged to deliver upon inclined serrated shaker bars 48 and 49 of well-known construction which are obliquely suspended from rearward extensions of frame members 13 above a shaking screen 50 suspended by means of links 51 and 52, and said shaking screen having connected therewith a forwardly-inclined grain pan 54 extending into a grain discharge chute 55. A fan casing 56 discharges a blast of air from a fan 57 therein through a spout 58 directly through the shaking screen 50 and shaker bars 48 and 49, as best shown in Fig. 1.

The various devices are operated in the following manner. The power is applied to shaft 29 through any desired source by means of a pulley fly wheel 59, from which shaft the endless belt 26 of Fig. 1 or the cylinders 30, 32 and beater 33 of Fig. 5 are directly driven. By means of a belt 60 running over pulleys on shaft 29 and on a shaft 61 journaled upon frame supports 11, said shaft 61 is rotated, which operates an eccentric 62 on said shaft which, through a rod or link 63 connected with grain incline 54, oscillates said grain incline and the shaking sieve 50. Upon the shaft 61 is a pulley 65 which, through belt 66 running over a pulley 67 on a shaft 68 journaled on frame uprights 10, rotates said shaft 68. As shown in Figs. 1 and 4, shaft 68 is provided with a pair of oppositely-disposed eccentrics 69 and 70, which eccentrics operate rods 71 and 72 that are pivotally connected with grid bars 39 and 40, respectively, as clearly shown in Fig. 4, thus communicating to said respective sets of grid bars simultaneous reciprocating movement in opposite directions. Links 73 and 74 are pivotally connected with bars 71 and 72, respectively, and in turn are pivotally connected with the respective sets of serrated shaker bars 48 and 49. A belt 75 from a pulley 76 on shaft 24 runs over a pulley 76' on the shaft of fan 57 by which said fan is operated. A feeder trough 77, or any approved feeding mechanism, is applied to the front end of the machine to direct grain or other material to the point of coöperation between teeth 22 on bar 21 and the teeth 27 of belt 26 or teeth 31 of cylinder 30.

The operation of the above construction will be apparent. When power is applied, the belt 26 (or the cylinders of Fig. 5) will be caused to move so as to carry the teeth 27 thereof between and past the teeth 22 on bar 21. At the same time the teeth 37 and 38 on grids 39 and 40 will be caused to oscillate not only past one another but past the rearwardly-moving teeth 27. The grain is carried from the feed platform 77 by teeth 27, first between and past teeth 22 and then between and past the reciprocating sets of teeth 37 and 38, the straw finally being discharged upon the shaker bars 48 and 49. The grid bars 39 and 40 are provided with a multiplicity of apertures 78 each of which is large enough to permit the passage of the largest seeds which may be threshed, such as peas or beans. The straw and grain although dragged rearward by the rearwardly-moving teeth 27 so that eventually the straw will be discharged upon shaking bars 48 and 49 is continually retarded and rubbed and straightened by the reversely reciprocating sets of teeth 37 and 38. This results in freeing the grain from the straw even though it be such small grains as wheat, rye, etc., and even though the various teeth or pins are spaced apart at their point of passing one another a distance sufficient to permit the threshing of such products as beans and peas without injuring the kernels thereof. Nearly all of this grain so freed will pass through the holes 78 in the grid bars, falling directly upon the shaking screen 50, which being subjected to the blast of air from fan 57 will prevent straw and chaff from going through the screen while the heavier grain finally passes through to the incline 54 and into the discharge pipe 55. Notwithstanding the compact and simple arrangement and method of operation of the elements of my separator it effects perfect cleaning of beans, peas and small grains with a small consumption of power relative to the rapidity of the grain-separating action.

The advantages of my invention are apparent and have been in the main indicated in the description of the operation thereof. A particular feature of utility of this construction is that it provides a small compact easily-operated threshing machine especially adapted for use on comparatively small farms whereby a farmer can do all of the threshing of the different kinds of products raised on the farm, peas, beans, wheat, oats, rye, etc., without the necessity of employing a special threshing crew or of hiring a threshing outfit for taking care of the small grain and requiring a separate pea or bean sheller for the leguminous crops.

I claim:

1. A threshing machine comprising a fixed toothed member, a pair of toothed slides, means for simultaneously reciprocating said slides in opposite directions, and a constantly-movable member having teeth coöperating with the teeth of said fixed member and said slides, said fixed toothed member being positioned at the feeding end of said constantly-movable member.

2. A threshing machine comprising a traveling toothed belt, a feeder member positioned at one end of the belt, a fixed toothed member at the end of the feeder member which is adjacent said belt, a pair of toothed slides coöperating with the teeth of said fixed member and belt, and means for simultaneously reciprocating said slides in opposite directions.

3. A threshing machine comprising a traveling toothed belt, a feeder member positioned at one end of the belt, a fixed toothed member at the end of the member which is adjacent said belt, a guard extending downwardly from said fixed member, a pair of toothed slides coöperating with the teeth of said fixed member and belt, and means for simultaneously reciprocating said slides in opposite directions.

4. A threshing machine comprising a continuous toothed belt, a feeder member pivotally mounted at one end of the belt near the center thereof, a fixed toothed member secured to the feeder member and movable therewith, means for holding the feeder member and the fixed tooth member in adjusted position relative to the toothed belt, and a reciprocating member positioned below the continuous belt and extending throughout the length thereof.

5. A threshing machine comprising a fixed member having a single row of teeth, a pair of grids having the bars thereof alternating with each other and conjointly forming a substantially horizontal plane surface positioned below and at one end adjacent said row of teeth, teeth on the grids, means for reciprocating said grids in said common plane, and means for pulling grain through the fixed row of teeth and through and past the reciprocating teeth on the grids.

6. A threshing machine comprising a fixed member having a single row of teeth, a pair of grids having the bars thereof alternating with each other and conjointly forming a substantially horizontal plane surface positioned below and at one end adjacent said row of teeth, teeth on the grids, means for reciprocating said grids in said common plane, and an endless belt provided with a plurality of sets of pins adapted to coöperate with said fixed row of teeth and the teeth of the reciprocating grids.

7. A threshing machine comprising a fixed member having a single row of teeth, a pair of grids having the bars thereof alternating with each other and conjointly forming a substantially horizontal plane surface positioned below and at one end adjacent said row of teeth, teeth on said grid, means for simultaneously reciprocating the grids in opposite directions and in said common plane, and means for drawing grain through the fixed row of teeth and through and past the sets of oppositely-reciprocating teeth of said grids.

8. A threshing machine comprising a fixed member having a single row of teeth, a pair of grids having the bars thereof alternating with each other and conjointly forming a substantially horizontal plane surface positioned below and at one end adjacent said row of teeth, teeth on said grid, means for simultaneously reciprocating the grids in opposite directions and in said common plane, and an endless belt provided with a plurality of teeth coöperating with said fixed row of teeth and with all of the teeth of the oppositely-reciprocating grids.

In testimony whereof I affix my signature in presence of two witnesses.

NELS G. EK.

Witnesses:
F. A. WHITELEY,
H. A. BOWMAN.

Copies of this patent may be obtained for five cents each, by addressing the "Commissioner of Patents, Washington, D. C."